US011257184B1

(12) United States Patent
Rehling

(10) Patent No.: US 11,257,184 B1
(45) Date of Patent: Feb. 22, 2022

(54) IMAGE SCALER

(71) Applicant: John F. Rehling, Encinitas, CA (US)

(72) Inventor: John F. Rehling, Encinitas, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/901,486

(22) Filed: Feb. 21, 2018

(51) Int. Cl.
G06T 3/40 (2006.01)
G06T 7/90 (2017.01)
G06T 5/20 (2006.01)
G06T 1/20 (2006.01)
G06T 5/00 (2006.01)

(52) U.S. Cl.
CPC .............. G06T 3/4023 (2013.01); G06T 1/20 (2013.01); G06T 5/002 (2013.01); G06T 5/20 (2013.01); G06T 7/90 (2017.01); G06T 2207/10024 (2013.01); G06T 2207/20192 (2013.01)

(58) Field of Classification Search
CPC ......... G06T 3/4023; G06T 5/002; G06T 5/20; G06T 1/20; G06T 7/90; G06T 2207/10024; G06T 2207/20192
See application file for complete search history.

(56) References Cited

U.S. PATENT DOCUMENTS

| 5,872,909 | A | 2/1999 | Wilner et al. |
| 5,909,577 | A | 6/1999 | Devanbu |
| 6,038,031 | A * | 3/2000 | Murphy ................ G06T 5/20 345/582 |
| 6,989,862 | B2 | 1/2006 | Baharav et al. |
| 7,996,765 | B1 | 8/2011 | Mitnick et al. |
| 8,111,331 | B2 | 2/2012 | Arnao et al. |
| 8,971,667 | B2 | 3/2015 | Chao et al. |
| 10,805,146 | B2 | 10/2020 | Bruckart et al. |
| 2002/0010909 | A1 | 1/2002 | Charisius et al. |
| 2003/0023956 | A1 | 1/2003 | Dulberg et al. |
| 2003/0214508 | A1 * | 11/2003 | Aleksic ................ G06T 15/503 345/589 |
| 2005/0047651 | A1 * | 3/2005 | Zheng .................. G06T 3/4038 382/162 |
| 2006/0159077 | A1 | 7/2006 | Vanecek, Jr. |
| 2006/0168331 | A1 | 7/2006 | Thompson et al. |
| 2006/0265659 | A1 | 11/2006 | Collins et al. |
| 2007/0112574 | A1 | 5/2007 | Greene |

(Continued)

FOREIGN PATENT DOCUMENTS

EP 0827615 B1 3/1998

OTHER PUBLICATIONS

European Office Action for Application No. 16 720 968.3-1224 dated Jan. 14, 2020.

(Continued)

Primary Examiner — John W Lee
(74) Attorney, Agent, or Firm — Tarolli, Sundheim, Covell & Tummino LLP

(57) ABSTRACT

In the described examples, a compiled image scaler includes a set of machine executable instructions that generate a scaled image that is a scaled version of a source image with integer and bitwise operations. The compiled image scaler employs filtering to blend colors of adjacent pixels in the source image to generate the scaled image, and each filtering operation concurrently scales three color channels of a pixel in the source image.

13 Claims, 7 Drawing Sheets

(56) References Cited

U.S. PATENT DOCUMENTS

| | | |
|---|---|---|
| 2007/0132779 A1 | 6/2007 | Gilbert et al. |
| 2007/0147334 A1 | 6/2007 | Guthrie |
| 2008/0009968 A1 | 1/2008 | Bruemmer et al. |
| 2008/0062438 A1 | 3/2008 | Lin et al. |
| 2008/0091365 A1* | 4/2008 | Tsang .................... G06T 11/001 702/71 |
| 2008/0095470 A1 | 4/2008 | Chao et al. |
| 2008/0177756 A1 | 7/2008 | Kosche et al. |
| 2009/0037894 A1 | 2/2009 | Unger |
| 2009/0145172 A1 | 6/2009 | Lubert et al. |
| 2009/0204633 A1 | 8/2009 | Bender et al. |
| 2009/0234903 A1 | 9/2009 | Lomelli et al. |
| 2010/0168874 A1 | 7/2010 | Lucas et al. |
| 2010/0232317 A1 | 9/2010 | Jing et al. |
| 2011/0216059 A1 | 9/2011 | Espiritu et al. |
| 2012/0011491 A1 | 1/2012 | Eldar |
| 2012/0131279 A1* | 5/2012 | Ciraula ................. G06F 12/123 711/128 |
| 2012/0238361 A1* | 9/2012 | Janis ....................... A63F 13/52 463/31 |
| 2012/0254874 A1 | 10/2012 | Siira et al. |
| 2012/0259909 A1 | 10/2012 | Bachelor et al. |
| 2013/0011076 A1* | 1/2013 | Obzhirov ............... H04N 19/34 382/251 |
| 2014/0033026 A1 | 1/2014 | Sheridan et al. |
| 2014/0201418 A1 | 7/2014 | Turner et al. |
| 2014/0281926 A1 | 9/2014 | Brenneman et al. |
| 2015/0026687 A1 | 1/2015 | Yim et al. |
| 2015/0074279 A1 | 3/2015 | Maes et al. |
| 2015/0178889 A1 | 6/2015 | Michel |
| 2015/0205696 A1 | 7/2015 | Hanckel et al. |
| 2015/0227270 A1 | 8/2015 | Yun et al. |
| 2015/0264554 A1 | 9/2015 | Addepalli et al. |
| 2015/0347108 A1* | 12/2015 | Munshi ..................... G06F 8/54 717/146 |
| 2016/0104204 A1 | 4/2016 | Greenberg et al. |
| 2016/0216072 A1 | 7/2016 | Mcneil et al. |
| 2016/0253908 A1 | 9/2016 | Chambers et al. |
| 2017/0195458 A1 | 7/2017 | Parekh et al. |
| 2017/0329730 A1 | 11/2017 | Sadhu |
| 2018/0105271 A1 | 4/2018 | Wypyszynski et al. |
| 2018/0188747 A1 | 7/2018 | Venturelli |
| 2018/0212863 A1 | 7/2018 | Akcan et al. |
| 2019/0246289 A1 | 8/2019 | Monga et al. |

OTHER PUBLICATIONS

Written Opinion and International Search Report for PCT/US2019/065505 dated Mar. 4, 2020.

Non Final Office Action for U.S. Appl. No. 16/250,927 dated Apr. 16, 2020.

Non Final Office Action for U.S. Appl. No. 16/178,345 dated Apr. 6, 2020.

Final Office Action for U.S. Appl. No. 16/178,345 dated Aug. 21, 2020.

Non Final Office Action for U.S. Appl. No. 15/946,180 dated Sep. 16, 2020.

Final Office Action for U.S. Appl. No. 15/946,180 dated Mar. 16, 2021.

* cited by examiner

```
200 ─┐
//************************************************************************
// MACROS TO SCALE A WHOLE PIXEL BY VARIOUS PERCENTAGES -- 2 CYCLES PER PIXEL   ─ 202
//************************************************************************
#define KERNEL_06(pixel) (((pixel) & 0x00F0F0F0) >> 4)  // take  6.25% of each channel
#define KERNEL_12(pixel) (((pixel) & 0x00F8F8F8) >> 3)  // take 12.50% of each channel
#define KERNEL_25(pixel) (((pixel) & 0x00FCFCFC) >> 2)  // take 25.00% of each channel
define KERNEL_50(pixel) (((pixel) & 0x00FEFEFE) >> 1)  // take 50.00% of each channel //************************************************************************
// QUAD-LINEAR ("BOX") FILTERING
//************************************************************************
void scale_by_50_quadlinear (UINT32 *dst, UINT32 *src, UINT32 src_wide, UINT32 src_high)   ─ 204
{
    // skip to the second pixel of the second line
    src += src_wide+1;                                              ─ 206

// precalculate relative offsets to the group of pixels to blend
    const int isup = -(int) src_wide;         // UPPER PIXEL
    const int isdn = +(int) src_wide;         // DOWN PIXEL const int uplt = -(int) (src_wide+1);     // UPPER LEFT PIXEL
    const int dnlt = +(int) (src_wide-1);     // DOWN LEFT PIXEL         ─ 210 const int uprt = -(int) (src_wide-1);     // UPPER RIGHT PIXEL
    const int dnrt = +(int) (src_wide+1);     // DOWN RIGHT PIXEL // loops to scale the source image into the destination buffer (scaled image)
    for (UINT32 y = 2; y < src_high; y += 2)
    {                                                                    ─ 212
        // fetch and scale column 0 pixels to blend
        UINT32 c0r0 = KERNEL_06 (src[uplt]);
        UINT32 c0r1 = KERNEL_12 (src[ -1]);                ─ 214
        UINT32 c0r2 = KERNEL_06 (src[dnlt]);

for (UINT32 x = 1; x < src_wide; x += 2)           ─ 216       218 ─┐
        {
            // fetch and scale column 1 & 2 pixels to blend
            //
            // column 1 (reuse col 0 vars)    column 2
            //------------------------------  ------------------------------
            c0r0 += KERNEL_12 (src[isup]);    UINT32 c2r0 = KERNEL_06 (src[uprt]);
            c0r1 += KERNEL_25 (src[  0]);     UINT32 c2r1 = KERNEL_12 (src[ +1]);
            c0r2 += KERNEL_12 (src[isdn]);    UINT32 c2r2 = KERNEL_06 (src[dnrt]);

// create the new, filtered pixel          ─ 219
            *dst++ = c0r0+c0r1+c0r2 + c2r0+c2r1+c2r2;

// copy column 2 to column 0 to avoid recalculations
            c0r0 = c2r0;
            c0r1 = c2r1;
            c0r2 = c2r2;

// skip to the next pixel of interest
            src += 2;
        }                                                              220 ─┘
        // skip to the next row of interest
        src += src_wide;                              ─ 222
    }
}
```

```
//**************************************************************
// BI-LINEAR FILTERING
//**************************************************************
void scale_by_50_bilinear (UINT32 *dst, UINT32 *src, UINT32 src_wide, UINT32 src_high)   ~254
{
    // skip to the second pixel of the second line                                        ~256
    src += src_wide+1;

// precalculate relative offsets to the group of pixels to blend
    const int isup = -(int) src_wide;  // UPPER PIXEL
    const int isdn = +(int) src_wide;  // DOWN PIXEL // scale the source image into the destination buffer (scaled image)                  ~260
    for (UINT32 y = 2; y < src_high; y += 2)
    {                                                                                      ~262
        // fetch and scale column 0 pixels to blend
        UINT32 pLT = KERNEL_12 (src[-1]);  // column 0
        UINT32 pRT;                         // used for column 2                           ~264 for (UINT32 x = 1; x < src_wide; x += 2)                                           ~266
        {
            // fetch and scale column 1 & 2 pixels to blend
            //
            // column 1                       column 2
            //--------------------------     --------------------------
            UINT32 pUP = KERNEL_12 (src[isup]);
            UINT32 pMD = KERNEL_50 (src[ 0]);  pRT = KERNEL_12 (src[+1]);
            UINT32 pDN = KERNEL_12 (src[isdn]);
                                                                                           ~268
            // create the new, filtered pixel
            *dst++ = pMD + pUP + pDN + pRT + pLT;                                          ~269

// copy column 2 to column 1 to avoid recalculation
            pLT = pRT;

// skip to the next pixel of interest
            src += 2;                                                                      ~270
        }

// skip to the next row of interest
        src += src_wide;
    }                                                                                      ~272
}
```

FIG. 3B

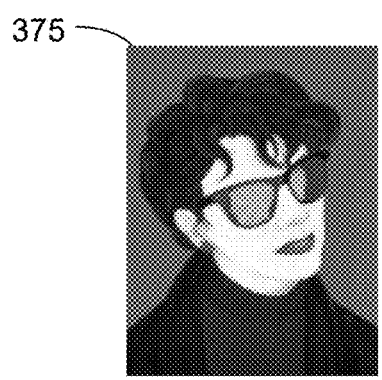
FIG. 6

# IMAGE SCALER

GOVERNMENT INTEREST

The invention was made under Government Contract Number N00019-17-C-0017. Therefore, the US Government has rights to the invention as specified in that contract.

TECHNICAL FIELD

This disclosure relates generally to machine readable instructions that include an image scaler.

BACKGROUND

In computer science, software rendering (or software rasterizing) is the process of generating an image from a model through computer software. In the context of computer graphics rendering, software rendering refers to a rendering process that is independent of graphics hardware application specific integrated circuits (ASICs), such as a graphics card. The rendering takes place entirely in a processing unit of a computer. Rendering with the (general-purpose) processing unit has the main advantage that it does not require graphics hardware to perform calculations.

In computer graphics and digital imaging, image scaling refers to the resizing of a digital image. In video technology, reduction of digital material is known as down-sampling or downscaling. Conversely, the magnification of digital material is known as up-sampling, upscaling or resolution enhancement.

Preprocessor directives are lines included in a program that begin with a predefined character (usually the hash character, #), which make the line of code different from a typical source code text. Preprocessor directives (also called macros) are brief abbreviations for longer constructs of source code. Preprocessor directives are invoked by a compiler to process some programs before final compilation.

Preprocessor directives change the text of the source code, replacing the directives with the indicated constructs of source code, and the result is a new source code without these directives.

SUMMARY

One example relates to a non-transitory machine-readable medium that stores machine readable instructions. The machine readable instructions includes a compiled image scaler comprising a set of machine executable instructions that generate a scaled image that is a scaled version of a source image with integer and bitwise operations. The compiled image scaler employs filtering to blend colors of adjacent pixels in the source image to generate the scaled image, and each filtering operation concurrently scales three color channels of a pixel in the source image.

Another example relates to a non-transitory machine-readable medium that stores machine readable instructions. The machine readable instructions comprising a compiled image scaler includes a set of executable instructions that generate a scaled image that is a scaled version of a source image with integer and bitwise operations. The compiled image scaler employs filtering to blend colors of an array of groups of adjacent pixels in the source image to generate the scaled image. The filtering for each group of adjacent pixels includes a masking operation and a bitwise shift to concurrently scale three color channels for each pixel in a respective group of adjacent pixels in the source image. The filtering also includes adding scaled color channels for each pixel in the respective group of adjacent pixels of the source image to generate a color of a corresponding pixel in the scaled image.

Yet another example relates to a method for resizing an image. The method includes selecting a given pixel of a source image and a corresponding pixel in a destination image comprising a resized version of the source image. The method also includes concurrently calculating a color scaling for a plurality of color channels of the given pixel of the source image with bitwise operations and concurrently calculating a color scaling for a plurality of color channels for pixels in the source image that are adjacent to the given pixel in the source image with bitwise operations. The method further includes combining the color scaling calculated for the plurality of color channels of the given pixel and the color channels of the pixels adjacent to the given pixel with integer operations to determine the color scale for each of a plurality of color channels of the corresponding pixel in the destination image. The method yet further includes changing the selecting from the given pixel to another pixel of the source image and the corresponding pixel to another corresponding pixel of the destination image.

BRIEF DESCRIPTION OF THE DRAWINGS

FIGS. 3A and 3B provide an example of source code for an image scaler.

FIG. 6 illustrates an example of an image being resized using quad-linear filtering or bi-linear filtering.

DETAILED DESCRIPTION

Example systems and methods for resizing an image are described. In particular, a compiled image scaler includes a set of machine executable (machine code) instructions. The instructions, upon execution, cause a processing unit to generate a scaled image that is a scaled version of a source image with integer and bitwise operations. The compiled image scaler employs filtering (quad-linear filtering or bi-linear filtering) to blend colors of an array of groups of adjacent pixels in the source image to generate the scaled image. The filtering for each group of adjacent pixels includes a masking operation and a bitwise shift to concurrently scale three color channels for each pixel in a respective group of adjacent pixels in the source image. The filtering also includes adding the scaled color channels for each pixel in the respective group adjacent pixels of the source image to generate a color of a corresponding pixel in the scaled image.

The systems and methods for resizing the image described herein avoid the need for floating point operations, such that the computational intensity of the processing unit (a general purpose processor) is reduced. Further, as explained herein, the scaling functions of the filtering are generated from macros in a corresponding source code file, such that the processing unit employs integer registers to execute the scaling functions.

Figure 1:
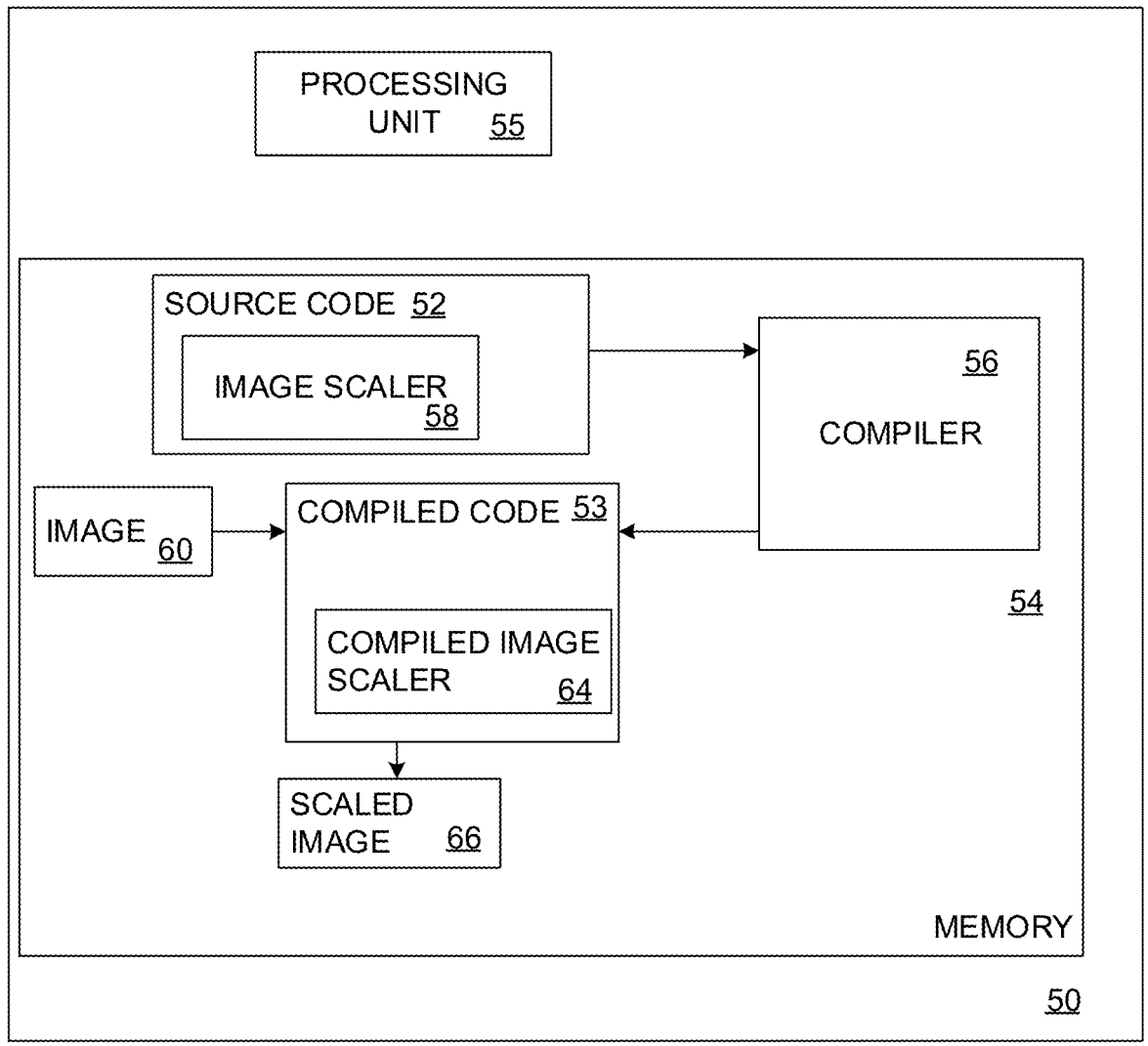
FIG. 1 is a block diagram of an example of a computing device for compiling source code and/or executing compiled code that resizes an image.

FIG. 1 illustrates a block diagram of a computing device 50 for compiling a source code 52 and/or executing compiled code 53. As explained herein, upon execution, the compiled code 53 is employable as an image resizer. In at least one example, the computing device 50 is a general purpose computer. In other examples, the computing device 50 is a programmed/configured machine that executes a specific task or set of tasks. The computing device 50 includes a memory 54 for storing data and machine-readable instructions, including the source code 52. The computing device 50 also includes a processing unit 55 that accesses the memory 54 and executes the machine-readable instructions.

The memory 54 is a non-transitory machine-readable medium. In some examples, the memory 54 is implemented as volatile memory (e.g., random access memory), non-volatile memory (e.g., a hard disk drive, a solid state drive, flash memory, etc.) or a combination thereof. The processing unit 55 is implemented as one or more processor cores of a given type (e.g., x86, ARM, etc.).

The memory 54 includes a compiler 56 that receives the source code 52. The source code 52 represents text of a high level computer language (e.g., human readable computer instructions) that allows preprocessor directives, such as but not limited to C, C++, C sharp (C#), Objective-C, Swift, Java, Python, etc.

The source code 52 includes an image scaler 58, a software module, that is employable (upon compilation and execution) to resize (change a size of) an image 60. The image 60 is implemented as a digital image stored in the memory 54, such as a pixmap (a bitmap). In the present examples, it is presumed that the image 60 is down-sampled (reduced), but in other examples, the same or similar techniques could be employed for up-sampling (magnification).

The compiler 56 converts the source code 52 into the compiled code 53. The compiled code 53 can be representative of application software that is compiled into machine executable instructions (machine code) executable by the processing unit 55. The compiled code 53 includes a compiled image scaler 64. The compiled image scaler 64 is functionally equivalent to the image scaler 58 of the source code 52. That is, the compiled image scaler 64 represents the machine executable instructions employed by the processing unit 55 to implement the operations of the image scaler 58 (that are written in the high level computing language).

Upon execution, the compiled code 53 includes execution of the compiled image scaler 64. The compiled image scaler 64 causes the processing unit 55 to generate a scaled image 66. The scaled image 66 is a resized version of the image 60.

It is understood that in FIG. 1, although one (1) computing device 50 is illustrated, in many examples, a different computing device executes the compiled code 53. That is, in such examples, the compiled code 53 is executed on a computing device different from the computing device that compiled the source code 52. It is understood that the computing device employed to execute (run) compiled code 116 has a set of machine code instructions that are compatible with the computing device on which the source code 102 was compiled.

The image scaler 58 of the source code 52 is written as a code module that employs integer and bitwise operations to implement filtering (quad-linear or bi-linear filtering) to blend colors of groups of adjacent pixels with a set of scaling operations. That is, the image scaler 58 avoids the need for floating-point based operations in scaling. In particular, the image scaler 58 employs bitwise shift operations to execute power of two mathematical operations to implement the scaling operations. Such bitwise shift operations (when compiled and executed by the processing unit 55) employ fewer computational cycles than corresponding floating point operations. Additionally, the scaling operations are constructed to concurrently scale color channels (red, green and blue color channels) of a given pixel, rather than individual operations for each color channel, further reducing the computational intensity of the scaling operations.

Furthermore, in some examples, the image scaler 58 includes macros with preprocessor directives to further reduce the number of computational cycles needed to implement the compiled code 53 as compared to a program that employed only functions.

By employment of the image scaler 58, the resulting compiled image scaler 64 is executed by the processing unit 55 in a fast and efficient manner. In particular, by implementing the image scaler 58 in the manner described, the need for floating point operations in the resulting compiled image scaler 64 is obviated. Thus, the processing unit 55 can execute the compiled image scaler 64 with integer and bitwise based operations.

Figure 2:
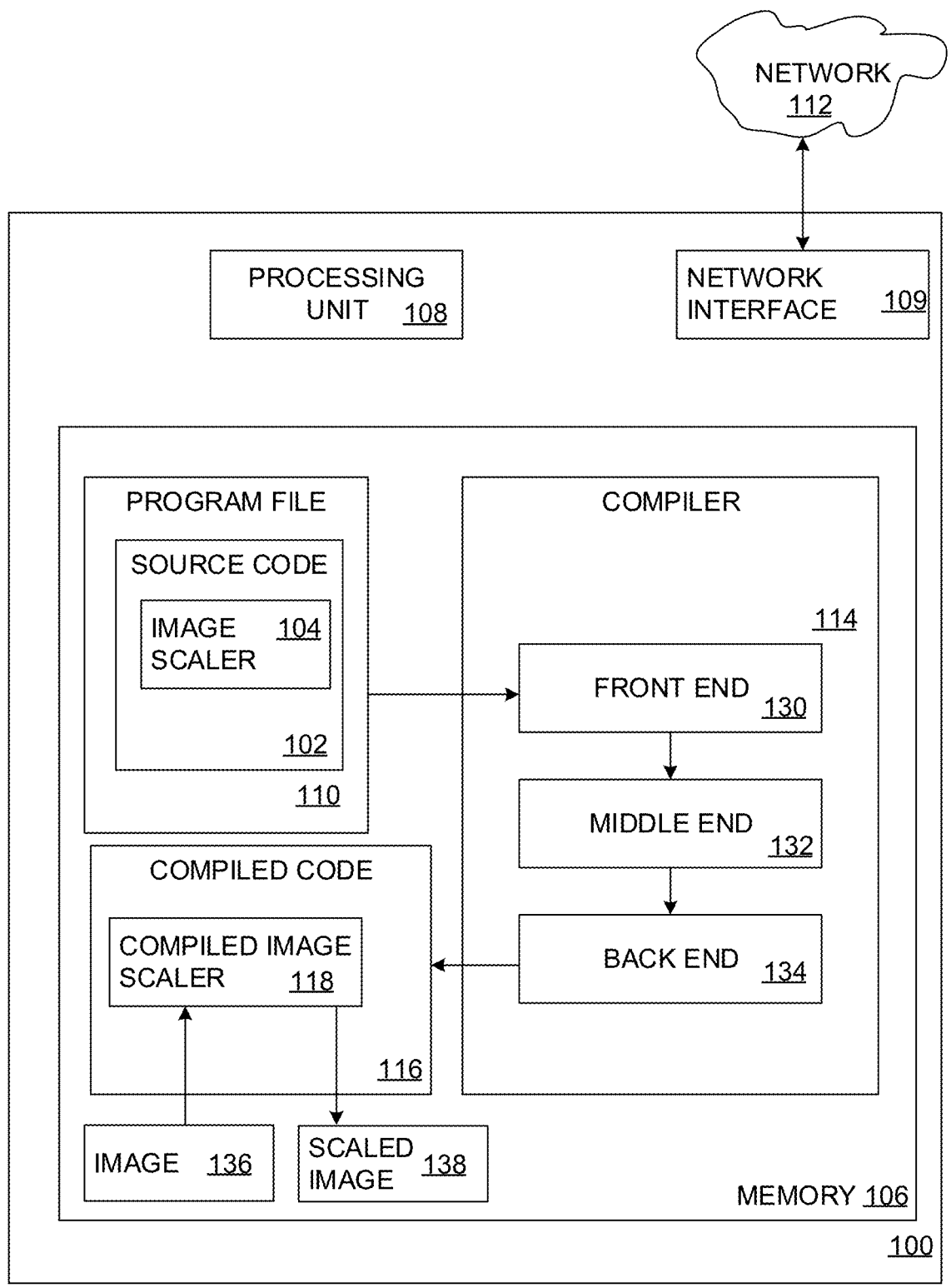
FIG. 2 is a block diagram of another example of a computing device for compiling source code and/or executing compiled code that resizes an image.

FIG. 2 illustrates an example of a computing device 100 for compiling source code 102 that includes an image scaler 104. In at least one example, the computing device 100 is a general purpose computer. In at least one other example, the computing device 100 is configured/programmed to execute a specific set of tasks, such as an application specific integrated circuit (ASIC) chip. The computing device 100 includes a memory 106 for storing data and machined executable instructions. The memory 106 is a non-transitory machine-readable medium. In at least one example, the memory 106 is implemented as non-volatile memory (e.g., a solid state drive, a hard disk drive, flash memory, etc.), volatile memory (e.g., random access memory) or a combination thereof.

The computing device 100 includes a processing unit 108 that accesses the memory 106 and executes the machine-readable instructions. The processing unit 108 includes one or more general purpose processor cores of a given type. As one example, the processing unit 108 is an x86 32 bit or 64 bit processing unit. In other examples, the processing unit 108 is an ARM processing unit. In fact, the processing unit 108 could be nearly any type of general purpose processing architecture.

In at least one example, the computing device 100 includes a network interface 109 for communicating on a network 112. In at least one example, the network interface 109 is implemented as a network interface card (NIC). In some examples, the network 112 is implemented as a public network (e.g., the Internet), a private network (e.g., a local area network (LAN)) or a combination thereof, such as a virtual private network (VPN).

In at least one example, the computing device 100 is implemented in a computing cloud. In such a situation, features of the computing device 100, such as the processing unit 108, the network interface 109, and the memory 106 are representative of a single instance of hardware or multiple instances of hardware with applications executing across the multiple of instances (i.e., distributed) of hardware (e.g., computers, routers, memory, processors, or a combination thereof). Alternatively, the computing device 100 could be implemented on a single computing device.

The memory 106 includes a program file 110 that has the source code 102 embedded therein. In at least one example, the program file 110 is provided from an external source (e.g., another computing device) via the network 112. In other examples, the program file 110 may be generated locally on the computing device (e.g., at a graphical user interface).

In at least one example, the source code 102 is text that represents computer instructions written in a given high level (human-readable) computer language, such as, but not limited to C, C++, C sharp (C#), Objective-C, Swift, Java, Python, etc. In some examples, the source code 102 is a full software application (App). In other examples, the source code 102 is a portion of an application or a library file that (upon compilation) is employable as object code (e.g., machine code in an object file that has not yet been linked into an executable application) by another software application.

The source code 102 includes the image scaler 104 embedded therein. The image scaler 104 is implemented as a module of high level computer language code that is employable to scale an image, such as a bitmap (e.g., a pixmap). In the examples explained herein, the image scaler 104 includes computer code for down-sampling (down scaling/shrinking) an image, such as a bitmap. Additionally or alternatively, the image scaler 104 could include computer code for up-sampling (magnifying) the image.

The memory 106 also includes a compiler 114. The compiler 114 converts the source code 102 into machine-executable instructions (e.g., machine code). The compiler 114 is programmed/configured to compile the source code 102 in the given high level computer language to generate compiled code 116 that includes a compiled image scaler 118. The compiler 114 supports the preprocessor directives in the source code 102 (including preprocessor directives of the image scaler 104) for adjusting machine-readable instructions generated for the source code 102.

The image scaler 104 includes a set of instructions that employ integer and bitwise operators to down-sample (or up-sample, in some examples) the image. Additionally, the image scaler 104 can be programmed to implement bi-linear and/or quad-linear filtering to enhance the quality of the scaled image. The combination of integer and bitwise operations avoids the need for computationally intensive floating point operations to scale the image. Additionally, the combination of integer and bitwise operations avoids the need to scale each pixel independently, further reducing computational intensity. Moreover, the image scaler 104 includes a plurality of macros identified with preprocessor directives to further curtail the computational intensity. In particular, the plurality of macros, upon compilation, efficiently leverage integer registers of the processing unit 108.

FIGS. 3A and 3B illustrate an example of a code block 200 (e.g., module) for implementing the image scaler 104 of FIG. 2 with quad-linear filtering and bi-linear filtering. However, it is understood that in some examples, only one of the quad-linear filtering (illustrated in FIG. 3A) and the bi-linear filtering (illustrated in FIG. 3B) may be employed. The code block 200 is written in C++, but it is understood that in other examples, other programming languages could be employed that allow preprocessor directives and bitwise operations. To down-sample a given pixel, a portion of color in a group pixels adjacent to the given pixel is employed to improve the final image quality. That is, instead of simply eliminating pixels during a down-sampling process, each pixel is blended with a predetermined portion of color of adjacent pixels to determine the color for the destination (scaled) pixel in the scaled image. In a quad-linear filtering identified in the code block 200, a predetermined portion defines a quad-linear kernel for each pixel in the scaled image. For the purposes used herein, the term "kernel" defines a relationship for blending colors of a group of adjacent pixels. More particularly, for a given group of adjacent pixels in the image, a kernel defines the portion of color each pixel in the given group of adjacent pixels that is employed to determine a color of the destination (scaled) pixel in the scaled image. In quad-linear filtering, Table 1 defines proportions characterizing the quad-linear kernel of the scaled image.

TABLE 1

| QUAD-LINEAR KERNEL | | | |
|---|---|---|---|
| | Column 0 | Column 1 | Column 2 |
| Row 0 | TL - 6.25% | TC - 12.5% | TR - 6.25% |
| Row 1 | CL - 12.5% | C - 25% | CR - 12.5% |
| Row 2 | BL - 6.25% | BC - 12.5% | BR - 6.25% |

As described in Table 1, the quad-linear kernel has three (3) columns of pixels, a first column (column 0), a second column (column 1) and a third column (column 2). Additionally, each column has three (3) rows of pixels, wherein the second row (row 1) includes a current pixel 'C'. Moreover, the notation employed in Table 1 indicates that in a quad-linear filtering kernel the current (center) pixel 'C' is blended with 6.25% of the color of the pixels that share a corner with the current pixel 'C', namely pixels that are at a top-left ('TL'), bottom-left ('BL'), top-right ('TR') and bottom-right ('BR') of the current pixel 'C'. Additionally, Table 1 indicates that for the quad-linear filtering kernel, the current (center) pixel 'C' is blended with 12.5% of the color of pixels that share an edge with the current pixel 'C', namely pixels that are at a top center ('TC'), a center-left ('CL'), a center-right ('CR') and a bottom-center ('BC') of the current pixel 'C'. Additionally, Table 1 indicates that 25% of the current pixel 'C' is employed. Thus, the scaled pixel has a sum total of 100% of the color from a combination of the center pixel 'C' with the eight (8) adjacent pixels.

The code block 200 includes macros 202 that define scaling operations. Each scaling operation includes a bitwise operations (e.g., a bitwise mask and a bitwise shift operator) that concurrently scales color channels of a pixel that is arranged in a UINT32 pixel format. The UINT32 pixel format defines a format for a 32 bit unsigned integer to store the color and alpha (transparency) of a single pixel. The UINT32 pixel format can be represented in a hexadecimal form. For the examples described herein, the UINT32 format in the hexadecimal form is defined as 0xAARRGGBB, wherein Table 2 defines the individual values of the UINT32 format.

TABLE 2

| UINT32 PIXEL FORMAT - 0xAARRGGBB | | |
|---|---|---|
| Channel Type | Notation | UINT32 MASK |
| Alpha Channel | AA | 0xFF000000 |
| Red Channel | RR | 0x00FF0000 |
| Green Channel | GG | 0x0000FF00 |
| Blue Channel | BB | 0x000000FF |

For purposes of simplification of explanation, it is presumed in the code block 200 that the image being scaled has an alpha channel (transparency) of '0', (e.g., opaque). Thus, the alpha channel is discarded. However, in other examples, the alpha channel could be leveraged in the scaling operation characterized by the image scaler 104 of FIG. 2.

Each of the macros 202 executes a scaling operation on a pixel in the UINT32 format. Tables 3-6 identify operations of each macro relative to a UINT32 formatted pixel, demonstrated with binary notation.

TABLE 3

| KERNEL_06(pixel) (((pixel) & 0x00F0F0F0) >> 4) | | | | |
| --- | --- | --- | --- | --- |
| UINT32 Binary format | Alpha | Red | Green | Blue |
| Notation | AAAAAAAA | RRRRRRRR | GGGGGGGG | BBBBBBBB |
| Command | | | | |
| pixel | -------- | 12345678 | 12345678 | 12345678 |
| pixel & 0x00F0F0F0 | -------- | 1234---- | 1234---- | 1234---- |
| pixel >> 4 | -------- | ----1234 | ----1234 | ----1234 |

TABLE 4

| KERNEL_12(pixel) (((pixel) & 0x00F8F8F8) >> 3) | | | | |
| --- | --- | --- | --- | --- |
| UINT32 Binary format | Alpha | Red | Green | Blue |
| Notation | AAAAAAAA | RRRRRRRR | GGGGGGGG | BBBBBBBB |
| Command | | | | |
| pixel | -------- | 12345678 | 12345678 | 12345678 |
| pixel & 0x00F8F8F8 | -------- | 12345--- | 12345--- | 12345--- |
| pixel >> 3 | -------- | ---12345 | ---12345 | ---12345 |

TABLE 5

| KERNEL_25(pixel) (((pixel) & 0x00FCFCFC) >> 2) | | | | |
| --- | --- | --- | --- | --- |
| UINT32 Binary format | Alpha | Red | Green | Blue |
| Notation | AAAAAAAA | RRRRRRRR | GGGGGGGG | BBBBBBBB |
| Command | | | | |
| pixel | -------- | 12345678 | 12345678 | 12345678 |
| pixel & 0x00FCFCFC | -------- | 123456-- | 123456-- | 123456-- |
| pixel >> 2 | -------- | --123456 | --123456 | --123456 |

TABLE 6

| KERNEL_50(pixel) (((pixel) & 0x00FEFEFE) >> 1) | | | | |
| --- | --- | --- | --- | --- |
| UINT32 Binary format | Alpha | Red | Green | Blue |
| Notation | AAAAAAAA | RRRRRRRR | GGGGGGGG | BBBBBBBB |
| Command | | | | |
| pixel | -------- | 12345678 | 12345678 | 12345678 |
| pixel & 0x00FEFEFE | -------- | 1234567- | 1234567- | 1234567- |
| pixel >> 1 | -------- | -1234567 | -1234567 | -1234567 |

In particular, as illustrated in Table 3, the macro labeled "KERNEL_06(pixel)" masks-off the alpha channel of a pixel, eliminates (clears) the 4 right-most bits each of the red, green and blue channels with a mask operation and then shifts each the remaining bits 4 bits to the right in a bitwise shift operation. In Table 4, the macro labeled "KERNEL_12(pixel)" masks-off the alpha channel of a pixel, eliminates the 3 right-most bits each of the red, green and blue channels with a mask operation and then shifts each of the remaining bits 3 bits to the right in a bitwise shift operation. In Table 5, the macro labeled "KERNEL_25(pixel)" masks-off the alpha channel of a pixel, eliminates the 2 right-most bits each of the red, green and blue channels with a mask operation and then shifts each of the remaining bits 2 bits to the right in a bitwise shift operation. In Table 6, the macro labeled "KERNEL_50(pixel)" masks-off the alpha channel of a pixel, eliminates the 1 right-most bit each of the red, green and blue channels by 1 bit with a mask operation and then shifts each of the remaining bits 1 bit to the right in a bitwise shift operation.

The operations demonstrated in by the Tables 3-6 are relatively simple bitwise operations that are equivalent to a relatively computationally intensive floating point operations. For instance, the KERNEL_06(pixel) macro is equivalent to the floating point operations of extracting each channel from the UINT32 pixel format into separate channel variables and multiplying each channel by 6.25% (0.0625), then recombining each resulting channels into a UINT32 pixel format. The KERNEL_06(pixel) macro is also equivalent to extracting each channel from the UINT32 pixel format and multiplying each channel by 6 and then dividing each channel by 100, and then recombining each resulting channel into a UINT32 pixel format. Similarly, macros KERNEL_12(pixel), KERNEL_25(pixel) and KERNEL_50(pixel) are equivalent to extracting each channel from the UINT32 pixel format into separate channel variables and multiplying each channel by 12.5% (0.125), 25% (0.25) and 50% (0.5), respectively and then recombining each resulting channels into a UINT32 pixel format. Additionally, as demonstrated in Tables 3-6, each channel color channel (red, green and blue) is processed concurrently, thereby further reducing the computational intensity relative to a function wherein the color channel is processed in separate operations. Moreover, each macro 202 can be executed (after compilation) in two (2) processor cycles. Conversely, processing each color channel individually with floating point operations may require 240 processor cycles or more. Also, conversely, processing each channel individually with integer operations may require 63 cycles or more.

The code block 200 includes a function declaration 204 for quad-linear filtering, which is referred to a quad-linear function. In the quad-linear function, a source image ("src") is scaled to 50% in a destination image ("dst") (the scaled image). In this manner, every other column and every other row of the source image is employed to generate a corresponding column or row in the destination image. Accordingly, two non-adjacent pixels (separated by a column) of the source image, src, correspond to two adjacent pixels of the destination image, dst. That is, the destination image, dst has one-quarter the pixels of the source image, src. In the example code block 200, the source image "src" and the destination image "dst" are each implemented as a single dimensional array, but in other examples, other dimensions of arrays could be employed. Additionally, the quad-linear function could be modified and/or augmented to allow resizing to other scales as well. Moreover, in the code block 200, the source image, src, being resized has a width defined in variable "src_wide" and a height defined in variable "src_high").

In a code line 206, the quad-linear function advances to the second pixel of the second line of the source image, src. In a code sub-block 210 of the quad-linear function, constants that define relative positions of pixels are defined. For example, a constant "isup" identifies a position (a pixel number) of a pixel that is at a top center ('TC' in Table 1) of a current pixel ('C' in Table 1). Additionally, a constant "isdn" identifies a position (pixel number) of a pixel at a bottom center ('BC' in Table 1) of the current pixel. Similarly constants, "uplt" and "dnit" identify positions (pixel numbers) of pixels that are at a top left ('TL' in Table 1) and bottom left ('BL') corner of the current pixel ('C' in Table 1), respectively. Further constants, "uprt" and "dnrt" identify positions (pixel numbers) of pixels that are at a top right ('TR' in Table 1) and bottom right ('BR') corner of the current pixel ('C' in Table 1), respectively.

In a code line 212, a for-loop is declared that controls a pixel-by-pixel generation of the destination image, dst. In particular, in the code line 212, the for-loop is set to initialize a control variable of two (2) and repeats as long the control variable is less than the height of the source image, src, and increments by two (2) indicating that every other line of the source image, src, is processed. Accordingly, two non-adjacent pixels (separated by a column) of the source image, src, correspond to two adjacent pixels of the destination image, dst. Each iteration of the for-loop defined by the code line 212 generates pixels for a full row of the destination image, dst.

Code sub-block 214 is within a body of the for-loop and defines how a first column (column 0) of each row of the source image, src is processed. As demonstrated by the code sub-block 214, three (3) pixels in the UINT32 format are declared using the macros 202 to set the parameters for the first column of the source image, src. At a code line 216, an inner for-loop is declared for generating pixels in a row the destination image, dst. In a code sub-block 218, the quad-linear filtering is defined for each pixel of the destination image. Moreover, as explained in the code sub-block 218, the first column (column 0) is re-used to calculate filtering for the current pixel in the current row. Additionally, in code line 219, calculated scaled colors are added (blended) together with an addition operation and stored in the destination image, dst. Further, in the code sub-block 220, a third column (column 2) for each pixel in the quad-linear function is copied to a data structure (variable) for a first column (column 0) for a subsequent pixel, and the source image, src, is advanced by two (2) to advance to the next pixel of interest. Additionally, in a code sub-block 222, the source image, src, is advanced by the full width, and the for-loop defined at code line 216 is repeated or exited.

Figure 4:
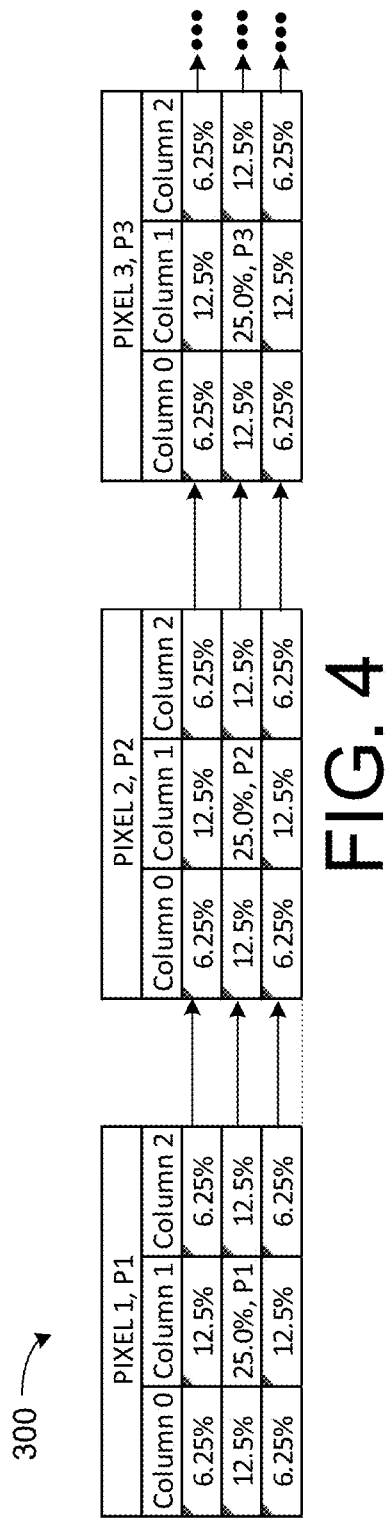
FIG. 4 illustrates a diagram of a process for quad-linear filtering.

As demonstrated by the code sub-blocks and/or lines 216-222, where appropriate, calculations are reduced to implement the quad-linear filtering. FIG. 4 illustrates how this reduction in calculations is achieved by the quad-linear filtering of FIG. 3A. As illustrated in a diagram 300 in FIG. 4, a first pixel, P1 in a given row of the destination image, dst, employs the quad-linear filtering defined by Table 1, which could be implemented by the code sub-block 218 of FIG. 3A. Additionally, a second pixel, P2 in the given row also employs scaling for the quad-linear filtering defined by Table 1. However, to avoid recalculating the scaling, as indicated by the code sub-block 220 of FIG. 3A, scaling values for column 2 (third column) of the first pixel, P1 are reused as the scaling values for column 0 (first column) of the second pixel, P2 in the given row. Moreover, this process is repeated for the third pixel, P3. In this manner, instead of 9 scaling calculations per pixel, for each pixel after the first pixel in the given row (each pixel after P1), six (6) scaling calculations (macro calls) are employed to implement quad-linear filtering, as demonstrated by the code sub-block 218 of FIG. 3A. Accordingly, as demonstrated in FIGS. 3A and 4, the quad-linear filtering reduces computational intensity needed to execute the code block 200.

Referring to FIG. 3B, the code block 250 also includes code for bi-linear filtering. For purposes of simplification of explanation, the code block 250 is considered to be an extension of the code block 200 of FIG. 3A. However, in other examples, the code block 250 of FIG. 3B could be modified to operate independently of the code block 200 in FIG. 3A. As noted, to down-sample a given pixel, a portion of color in adjacent (neighboring) pixels is employed to improve the final image quality. That is, instead of simply eliminating pixels during a down-sampling process, each pixel is blended with a predetermined portion of color of adjacent pixels to determine the color for the destination (scaled) pixel in the scaled image, which predetermined portion defines a bi-linear kernel for each pixel in the scaled image. In bi-linear filtering, Table 7 defines a table characterizing the bi-linear kernel (a group of adjacent pixels) of the scaled image.

TABLE 7

| | BI-LINEAR FILTERING KERNEL | | |
|---|---|---|---|
| | Column 0 | Column 1 | Column 2 |
| Row 0 | TL -XX | TC - 12.5% | TR - XX |
| Row 1 | CL - 12.5% | C - 50% | CR - 12.5% |
| Row 2 | BL-XX | BC - 12.5% | BR-XX |

Similar to the quad-linear kernel, as described in Table 7, the bi-linear kernel has three (3) columns of pixels, a first column (column 0), a second column (column 1) and a third column (column 2). Additionally, the second column (column 1) has three (3) rows of pixels and the first column (column 0) and the third column (column 2) has one row of pixels, wherein a second row (row 1) includes the current pixel 'C'. The notation employed in indicates that in a bi-linear filtering kernel the current (center) pixel 'C' is blended with 6 with 12.5% of the color of pixels that share an edge with the current pixel 'C', namely pixels that are at a top center ('TC'), center-left ('CL'), a center-right ('CR') and a bottom-center ('BC') of the current pixel 'C'. Additionally, Table 7 indicates that 50% of the current pixel 'C' is employed. Thus, the scaled pixel has a sum total of 100% of the color from a combination of the center pixel 'C' with the four (4) adjacent pixels. Moreover, in contrast to Quad-linear filtering, the pixels sharing a corner with the current pixel, 'C', namely the pixels at a top left ('TL'), a bottom left ('BL'), a top right ('TR') and a bottom right ('BR') are ignored.

As noted, for purposes of simplification of explanation, the code block 250 is considered to be an extension of the code block 200 of FIG. 3A. Thus, the code block 250 of FIG. 3B includes calls to the macros 202 of FIG. 3A. However, the code block 250 could be re-written to be independent of the code block 200 of FIG. 3A.

The code block 250 includes a function declaration 254 for bi-linear filtering, which is referred to as a bi-linear function. In the bi-linear function, the source image, "src", is scaled to 50% in the destination image, "dst" with bi-linear filtering (blending). In the example code block 250, the source image "src" and the destination image "dst" are each implemented as a single dimensional array. Moreover, in the code block 250, the source image being resized has a width defined in a variable "src_wide" and a height with a defined variable "src_high"). Additionally, the bi-linear function could be modified and/or augmented to allow resizing to other scales as well. In a code line 256, the bi-linear function advances to the second pixel of the second line of the source image, src.

In a code sub-block 260 of the quad-linear function, constants that define relative positions of pixels are defined. For example, a constant "isup" identifies a position (a pixel number) of a pixel that is at a top center ('TC' in Table 7) of a current pixel ('C' in Table 7). Additionally, a constant "isdn" identifies a position (pixel number) of a pixel at a bottom center ('BC' in Table 7) of the current pixel ('C' in Table 7).

In a code line 262, a for-loop is declared that controls a pixel-by-pixel generation of the destination image, dst. In particular, in the code line 262, the for-loop is set to initialize a control variable of two (2) and repeats as long as the control variable is less than the height of the source image, src and increments by two (2) indicating that every other line of the source image, src is processed. Each iteration of the for-loop defined by the code line 262 generates pixels for a full row of the destination image, dst.

Code line 264 is within a body of the for-loop and defines how a first column (column 0) of a current row of the source image, src is processed. As demonstrated by the code sub-block 264, two (2) pixels in the UINT32 format are declared using the macros 202 to set the parameters for the first column of the source image, src. At a code line 266, an inner for-loop is declared for generating pixels in a given row of the destination image, dst. In a code sub-block 268, the bi-linear filtering is defined for each pixel of the destination image. Additionally, in code line 269, calculated scaled colors are added (blended) together with an addition operation and stored in the destination image, dst. Moreover, as explained in the code sub-block 270, the first column (column 0) is re-used to calculate filtering for the second column (column 1) for each pixel. Further, in the code sub-block 270, a third column (column 2) for each pixel in the bi-linear function is copied to a data structure (variable) a first column (column 0) for a subsequent pixel and the source image is advanced by two (2) to select a next pixel of interest. Additionally, in a code sub-block 272, the source image, src, is advanced by the full width to select a next row of interest, and where the for-loop defined at code line 262 is repeated or exited.

Figure 5:
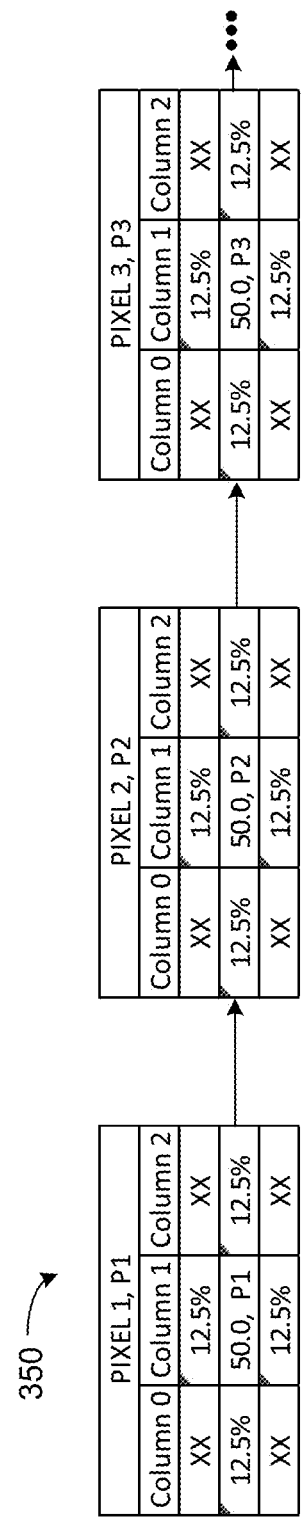
FIG. 5 illustrates a diagram of a process for bi-linear filtering.

As demonstrated by the code sub-blocks and/or lines 262-272, where appropriate, calculations are reduced to implement the bi-linear filtering. FIG. 5 illustrates this reduction in calculations achieved by the bi-linear filtering of FIG. 3B. As illustrated in a diagram 350 in FIG. 5, a first pixel, P1 in a given row of the destination image, dst employs the bi-linear filtering defined by Table 7, which could be implemented by the code sub-block 268 of FIG. 3A. Additionally, a second pixel, P2 in the given row also employs scaling for the bi-linear filtering defined by Table 7. However, to avoid recalculating the scaling, as indicated by the code sub-block 270 of FIG. 3A, the scaling value for column 2 (third column) of the first pixel, P1 is reused as the scaling value for column 0 (first column) of the second pixel, P2 in the given row. Moreover, this process is repeated for the third pixel, P3. In this manner, instead of 5 scaling calculations per pixel, for each pixel after the first pixel in the given row (each pixel after P1), four (4) scaling calculations (macro calls) are employed to implement bi-linear filtering, as demonstrated by the code sub-block 268 of FIG. 3A. Accordingly, as demonstrated in FIGS. 3B and 5, the bi-linear filtering reduces the computational intensity needed to execute the code block 250.

In code blocks 200 and 250 of FIGS. 3A and 3B, the quad-linear function and the bi-linear function are defined. Quad-linear filtering (executed in the quad-linear function) achieves a higher resolution than bi-linear filtering (executed in the bi-linear function) at a cost of an increase in the number of operations (processor cycles). However, for both the code blocks 200 and 250, integer and bitwise operations are employed to implement operations that may have scaling operations for each individual color channel and (in some examples) floating point operations. Additionally, by combining multiple operations into single lines of code (in the macros 202), further reduction of computational cycles is achievable.

Referring back to FIG. 2, the compiler 114 receives the program file 110 at a front end 130 of the compiler 114. The front end 130 verifies syntax and semantics of the source code 102 according to the given high-level computer language (source code) that the compiler is programmed/configured to transform to a target language (object code). The front end 130 executes type-checking by collecting type information and generates errors and warnings for the source code 102. The front end 130 can execute lexical analysis, syntax analysis, and semantic analysis for the source code 102. Additionally, the front end 130 includes a preprocessor that executes preprocessor directives in the source code 102 (denoted by the hash symbol (#)). For instance, the preprocessor can rewrite the code blocks 200 and 250 of FIGS. 3A and 3B to include inline instructions for the macros 202. The front end 130 of the compiler 114 analyzes the source code 102 to build an internal representation of the program, which may be referred to as an intermediate representation or IR. The IR is a lower level of representation of the program with respect to the source code 102. The front end 130 also manages a symbol table, a data structure mapping each symbol in the source code 102 to associated information such as location, type and scope.

The IR is passed to a middle end 132 of the compiler 114. The middle end 132 executes machine independent adjustments (e.g., optimizations). In some examples, such adjustments includes removal of useless (dead code elimination) or unreachable code (reachability analysis), detection and propagation of constant values (constant propagation), relocation of computation to a less frequently executed place (e.g., out of a loop) or specialization of computation based on the context. The middle end 132 generates an adjusted IR that is passed to a back end 134. Additionally, in some examples, the middle end 132 is omitted or makes no adjustments to the IR, such that the back end 134 receives the IR.

In at least one example, the back end 134 executes additional analysis, transformations and adjustments (optimizations) that are for the given type of the processing unit 108. The back end 134 generates a target-dependent assembly code, and performs a register allocation process for the processing unit 108. The back end 134 also apportions utilization of the hardware of the computing device 100 for the adjusted IR (or the IR) to generate a specific order of assembly instructions. The back-end 134 is also representative of an assembler and/or linker to convert the assembly instructions into a set of machine executable (machine code) instructions.

The back end 134 outputs the compiled code 116 that includes machine executable (machine code) instructions for implementing the source code 102. The compiled code 116 includes the compiled image scaler 118 that represents a portion of the compiled code 116 that executes the function corresponding to the image scaler 104 of the source code 102. That is, the compiled image scaler 118 represents a compiled version of the image scaler 104. In at least one example, the compiled code 116 is a fully executable application. In at least one other example, the compiled code 116 is code that is utilizable by another application, such as object code that is executable through an application programming interface (API).

The compiled code 116 is executable by the processing unit 108. Moreover, it is understood that in FIG. 2, although one computing device 100 is illustrated, in many examples, a different computing device executes the compiled code 116. That is, in such examples, the compiled code 116 is executed on a computing device different from the computing device that compiled the source code 102.

Upon a call to the compiled image scaler 118 (by the compiled code 116 or by an external software system), the processing unit 108 executes the compiled image scaler 118. Execution of the compiled image scaler 118 causes the processing unit 108 to resize an image 136 (the source image, src in FIGS. 3A and 3B) and generates a scaled image 138 (the destination image, dst of FIGS. 3A and 3B). The scaled image 138 is a resized version of the image 136, which can be output by a display. In some examples, the scaled image 138 may be generated with quad-linear filtering (as demonstrated by the code block 200 of FIG. 3A). In other examples, the scaled image 138 may be generated with bi-linear filtering (as demonstrated by the code block 250 of FIG. 3B). For purposes of simplification of explanation, it is presumed that the image 136 and the scaled image 138 (resized image) are in the same format (e.g., a bitmap format). However, in other examples, the compiled code 116 can include instructions for changing a format of the scaled image 138.

FIG. 6 illustrates an example of an image resized to generate a scaled image. FIG. 6 includes an image 370 that could represent the image 136 of FIG. 2. FIG. 6 also includes a scaled image 375 that could represent the scaled image 138 of FIG. 2 generated with quad-linear filtering. FIG. 6 additionally includes a scaled image 380 that could represent the scaled image 138 generated with bi-linear filtering.

Referring back to FIG. 2, by implementing the image scaler 104 illustrated in the code blocks 200 and 250 of FIGS. 3A and 3B, a relatively efficient process for resizing the image 136 is achieved. For instance, by using traditional floating-point operations to scale an image with blending, each pixel may require 240 or more processor cycles. By using traditional integer operations to scale an image with blending, each pixel may require 63 or more processor cycles. In contrast, by utilizing the image scaler 104 described herein, the resultant compiled image scaler 118 may need about 2 (two) cycles per pixel for bi-linear filtering. Thus, the operations demonstrated may achieve the same results with up to about 238 less cycles per pixel using traditional floating point operations, and about 61 less cycles using traditional integer operations.

In view of the foregoing structural and functional features described above, an example method will be better appreciated with reference to FIG. 6. While, for purposes of simplicity of explanation, the example method of FIG. 6 is shown and described as executing serially, it is to be understood and appreciated, unless otherwise noted, that the present examples are not limited by the illustrated order, as some actions could in other examples occur in different orders, multiple times and/or concurrently from that shown and described herein. Moreover, it is not necessary that all described actions be performed to implement a method.

Figure 7:
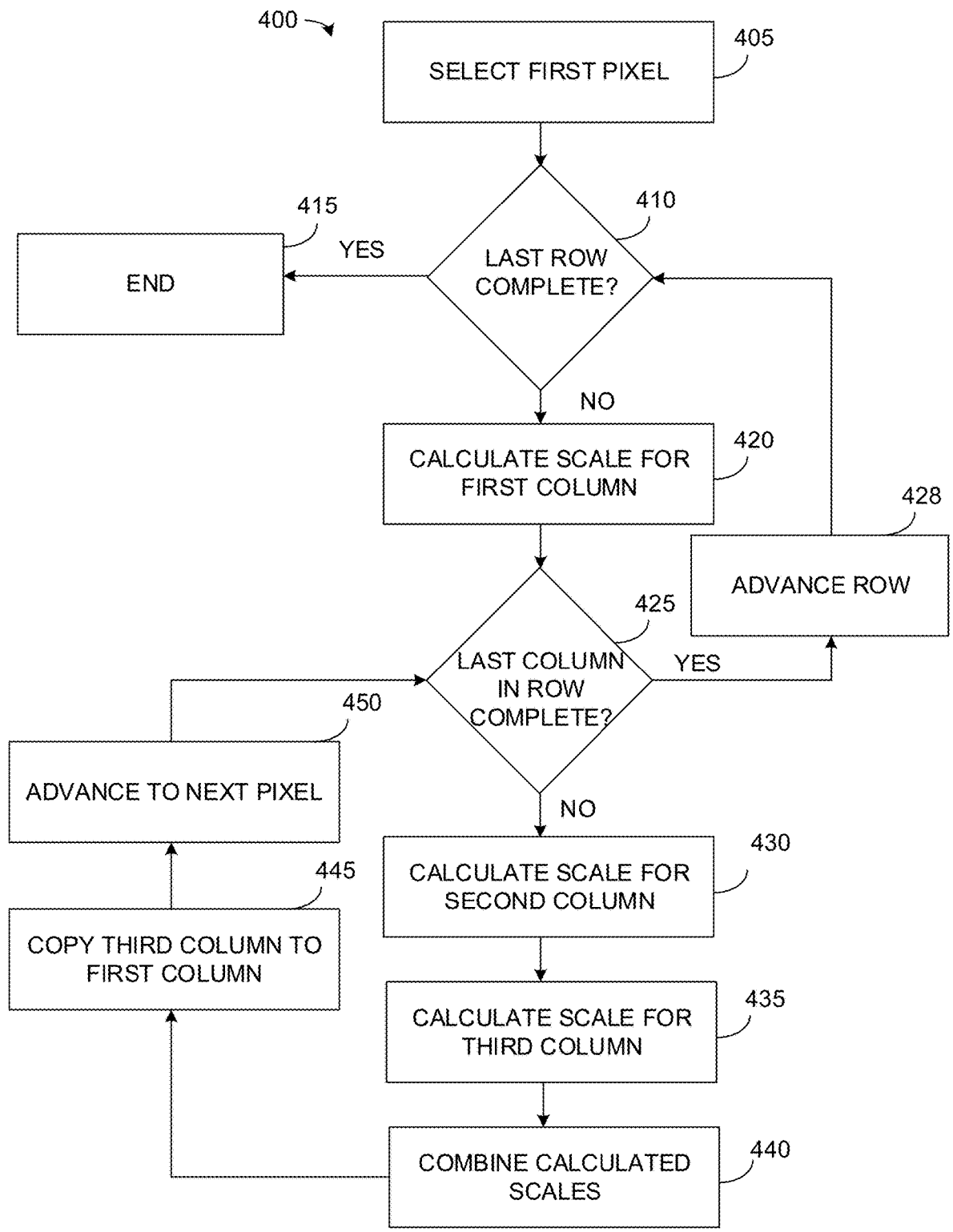
FIG. 7 is a flowchart of an example method for resizing an image.

FIG. 7 illustrates a flowchart of a method 400 for resizing a source image to generate a destination image that is a scaled version of the source image. The method 400 could be executed, for example, by the computing device 50 and/or the computing device 100 of FIG. 2. The method 400 could be employed in either quad-linear filtering or the bi-linear filtering described with respect to FIGS. 3A and 3B. That is, the method 400 illustrates a flow of a compiled form of the code blocks 200 and 250 illustrated in FIG. 3A, such as the compiled image scaler 64 of FIG. 1 and/or the compiled image scaler 118 of FIG. 2.

At 405, a first pixel of a source image is selected for scaling to generate the first pixel of the destination image. The first pixel of the destination image could correspond to a second pixel in a second row of the source image, as illustrated by code lines 206 and 256 of FIGS. 3A and 3B.

At 410, a determination can be made as to whether the last row of the source image has been completed. The determination at 410 could correspond to the declaration of the for-loops indicated by code lines 212 and 262 of FIGS. 3A and 3B. If the determination at 410 is positive (e.g., YES), the method 400 proceeds to 415, wherein the method 400 ends. If the determination at 410 is negative (e.g., NO), the method 400 proceeds to 420.

At 420, a scale of a first column (column 0) in a given row is calculated for a current pixel. The scale of the first column could correspond to the code sub-block 214 of FIG. 3A or the code sub-block 264 of FIG. 3B. At 425, a determination is made as to whether a last column in the given row is completed. The determination at 425 could correspond to the declaration of the for-loops by code lines 216 and 266 of FIGS. 3A and 3B. If the determination at 425 is positive (e.g., YES), the method 400 proceeds to 428. If the determination at 425 is negative (e.g., NO), the method 400 proceeds to 430. At 428, the row is advanced, and the method 400 returns to 410. The action at 428 could correspond to the code sub-block 222 of FIG. 3A or the code sub-block 272 of FIG. 3B.

At 430, a scale is calculated for the second column (column 1) of the current pixel. At 435, a scale is calculated for the third column (column 2) of the current pixel. The actions at 430 and 435 could correspond to the code sub-block 218 of FIG. 3A (quad-linear filtering) or the code sub-block 268 of FIG. 3B (bi-linear filtering). At 440, the calculated scales are combined. The action at 440 could correspond to the code line 219 of FIG. 3A or code line 269 of FIG. 3B.

At 445, the third column (column 2) of the given pixel is copied data structure (variable) to a first column (column 0) of a next pixel. At 450, the next pixel in the given row is selected. The actions at 445 and 450 could correspond to the code sub-block 220 of FIG. 3A or the code sub-block 270 of FIG. 3B.

By employment of the method 400, the source image can be resized to generate the destination image using integer and bitwise operators, which reduces the number of computing cycles needed to execute the method 400. Moreover, as described herein, multiple color channels for each pixel can be scaled concurrently, thereby further reducing the number of computing cycles needed to execute the method 400.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine-readable medium that stores machine readable instructions, the machine readable instructions comprising:
   a compiled image scaler comprising a set of machine executable instructions that generate a scaled image that is a resized version of a source image, wherein the scaling is executed with integer and bitwise operations defined by a macro that employs integer registers of a central processing unit (CPU);
   wherein the compiled image scaler employs a filtering operation that executes bitwise shift operations and bitwise mask operations defined by the macro on integers to blend colors of adjacent pixels in the source image to generate the scaled image, and each filtering operation concurrently scales three color channels of a pixel in the source image and masks off an alpha channel of the pixel in the source image by eliminating the alpha channel, such that each bit of the alpha channel of the pixel in the source image stores a null value in response to the filtering operation that masks off the alpha channel, a proper subset of bits of each of a red, green and blue channel of the three color channels of the pixel in the source image are eliminated by bitwise mask operations of the filtering operation, and a remaining subset of bits of each of the red, green and blue channel of the three color channels of the pixel in the source image are shifted by bitwise shift operations of the filtering operation.

2. The medium of claim 1, wherein the filtering operation comprises quad-linear filtering.

3. The medium of claim 2, wherein the quad-linear filtering comprises blending 25% of color of a given pixel in the source image with 6.25% of color in pixels sharing a corner with the given pixel and 12.5% of color in pixels sharing an edge with the given pixel.

4. The medium of claim 1, wherein the filtering operation comprises bi-linear filtering.

5. The medium of claim 4, wherein the bi-linear filtering comprises blending 50% of color of a given pixel in the source image with 12.5% of color in pixels sharing an edge with the given pixel.

6. The medium of claim 1, wherein the filtering operation comprises execution of code generated from a plurality of macros in a corresponding source file.

7. The medium of claim 1, wherein the compiled code is an executable software application or object code stored in a library file.

8. The medium of claim 1, wherein the machine executable instructions are executable one of an x86 processor and an ARM processor.

9. A non-transitory machine-readable medium that stores machine readable instructions, the machine readable instructions comprising:
   a compiled image scaler comprising a set of executable instructions that generate a scaled image that is a resized version of a source image, wherein the scaling is executed with integer and bitwise operations defined by a macro that employs integer registers of a central processing unit (CPU);
   wherein the compiled image scaler employs a filtering operation that executes bitwise shift operations and bitwise mask operations defined by the macro on integers to blend colors of an array of groups of adjacent pixels in the source image to generate the scaled image, and the filtering operation for each group of adjacent pixels comprises:
   a masking operation and a bitwise shift executed on integers to concurrently scale three color channels for each pixel in a respective group of adjacent pixels in the source image and masks off an alpha channel of each pixel in the respective group in the source image, such that each bit of the alpha channel of each of the pixels in the respective group in the source image stores a null value; and
   adding scaled color channels for each pixel in the respective group of adjacent pixels of the source image to generate a color of a corresponding pixel in the scaled image, wherein a proper subset of bits of each of a red, green and blue channel of the three color channels of each pixel in the source image are eliminated by a bitwise mask operation of the filtering operation, and a remaining subset of bits of each of the red, green and blue channel of the three color channels of the pixel in the source image are shifted by bitwise shift operations of the filtering operation.

10. The medium of claim 9, wherein the filtering operation comprises quad-linear filtering, and each pixel in the scaled image corresponds a blending of colors from pixels in the source image that share an edge or corner with a corresponding pixel in the source image.

11. The medium of claim 9, wherein the filtering operation comprises bi-linear filtering, and each pixel in the scaled image corresponds to a blending of colors from pixels that share an edge with a corresponding pixel in the source image.

12. The medium of claim 9, wherein the filtering operation further comprises copying scaled color channels calculated for a third column of a given group of adjacent pixels to a data structure for scaled color channels of a first column of a next group of adjacent pixels in the array of groups of adjacent pixels.

13. The medium of claim 9, wherein the filtering operation further comprises execution of code generated from a plurality of macros in a corresponding source code for the compiled image scaler.

\* \* \* \* \*